United States Patent [19]

Berry et al.

[11] Patent Number: 5,816,117
[45] Date of Patent: Oct. 6, 1998

[54] DUAL INPUTS AND DUAL OUTPUTS HARMONIC DRIVE APPARATUS

[75] Inventors: Robert G. Berry, Dauvers; Losa Gee, Brookline, both of Mass.; Robert P. Lascelles, York, Me.; Carmine G. Tortora, Andover, Mass.

[73] Assignee: Teijiu Seiki Co., Ltd., Japan

[21] Appl. No.: 820,954

[22] Filed: Mar. 19, 1997

[51] Int. Cl.$^6$ .......................... F16H 1/00; F16H 1/32
[52] U.S. Cl. ........................... 74/640; 74/665 L
[58] Field of Search ........................... 74/640, 665 L

[56] References Cited

FOREIGN PATENT DOCUMENTS

| | | | |
|---|---|---|---|
| 62-246645 | 10/1987 | Japan | 74/640 |
| 215258 | 11/1967 | U.S.S.R. | 74/640 |
| 506706 | 5/1976 | U.S.S.R. | 74/640 |
| 578515 | 10/1977 | U.S.S.R. | 74/640 |
| 1361038 | 12/1987 | U.S.S.R. | 74/640 |
| 1395872 | 5/1988 | U.S.S.R. | 74/640 |
| 1714247 | 2/1992 | U.S.S.R. | 74/640 |
| 1740826 | 6/1992 | U.S.S.R. | 74/640 |

*Primary Examiner*—Khoi Q. Ta
*Attorney, Agent, or Firm*—Don Halgren

[57] ABSTRACT

The present invention comprises a harmonic drive transmission for the simultaneous production of a first and a second rotary output. The invention includes a primary housing, a first flexspline may be hermetically secured within the housing with a first wave generator arranged therewithin. A second flexspline may be hermetically secured to the first flexspline within the housing, the second flexspline having a second wave generator arranged therewithin. A first driveshaft is connected to the second wave generator, and a second driveshaft is connected to the first wave generator. A first circular spline is in engagement with a plurality of gear teeth and connected to a first output shaft, and a second circular shaft is in engagement with a plurality of gear teeth and is connected to a second output shaft, to provide simultaneous output by a plurality of output shafts from a hermetically arranged harmonic drive transmission.

19 Claims, 1 Drawing Sheet

DUAL INPUTS AND DUAL OUTPUTS HARMONIC DRIVE APPARATUS

BACKGROUND OF THE INVENTION

1. Field of the Invention

This invention relates to harmonic drive transmissions, and more particularly to a harmonic drive transmission having a dual input and a dual output for hermetically sealed utilization.

2. Prior Art

Harmonic drive transmissions, sometimes known as controlled radial deflection type transmissions, are used where rotary to rotary transmission is needed. In such a transmission, the gear tooth engagement is induced at a plurality of points by the deflection of a thin ring gear or the like. The tooth engagement at a plurality of points around the circumference is propagated along the periphery of a thin ring gear as the crest of the induced deflection ring is made to move around this periphery. As the deflection moves around the gear, each tooth moves radially in and out of engagement as it progresses from one tooth to the next, tracing during this motion, a curve which is generally of the character of a sinusoidal wave, giving rise to the term, "strain wave gearing".

Examples of early transmissions of this type, are shown in U.S. Pat. No. 2,906,143, issued in 1959 to Musser, U.S. Pat. No. 2,931,249 issued to Musser, and U.S. Pat. No. 3,196,713 issued to Robinson, all of which are incorporated herein by reference.

Those transmissions have found use in certain industries where rotary power is needed, yet contamination from any part of the machinery within the worked field would be critical to the work product. The provision of positive, accurately controlled transmission of motion through an uninterrupted metallic barrier is desired, also in those certain fields. Since no packing, bellows or fallible seal is used, some containment of contamination utilizing a harmonic drive transmission, may be obtained. Such a unit is shown in U.S. Pat. No. 3,196,713 to H. A. Robinson, issued in Jul. 27, 1965, entitled "Hermetically Sealed Transmissions". Such a unit may provide typical rotary-to-rotary power utilizing the same three basic components of harmonic drive transmissions, but their configuration has been altered to meet the specific feed through requirement. The flexspline is a flexible walled tube with one end closed by welding its edge to a disc or diaphragm, and the other end of the tube is bolted or welded to a mounting flange. The wave generator, operating inside the stationary flexspline deflects the walls of the tube and flexspline combination into engagement with the circular spline, which functions as the output member and delivers a rotation in the same direction as the input.

It is an object however of the present invention, to provide an improvement over the hermetically sealed transmissions of the prior art harmonic drive units.

It is yet a further object of the present invention, to provide a hermetically sealed harmonic drive transmission which may be utilized in a field where contamination of any sort would be absolutely critical to the product being produced.

It is also an object of the present invention, to provide a harmonic drive transmission with multiple output capabilities.

It is still yet a further object of the present invention, to provide a harmonic drive transmission with dual input capabilities.

BRIEF SUMMARY OF THE INVENTION

The present invention comprises a harmonic drive transmission, having a dual coaxial output therefrom and a dual coaxial input. The harmonic drive transmission comprises a primary housing having a first or input end and a second or output end. The housing has an opening at its input end. A first flexspline, having an open annular end portion, is attached to the inside wall of the first end of the primary housing, radially of the opening thereat. The first flexspline has a cup end opposed to its open end. The cup end includes a small opening to permit a drive shaft to extend therethrough. The cup end of the first flexspline has an annular shoulder thereat. A second flexspline, having an open end with an annular rim there around, is attached to the shoulder and the cup end of the first flexspline. The second flexspline is of a second internal diameter having a closed diaphragm end. A first input, comprising a hollow tubular shaft, is disposed through the opening at the first end of the primary housing, and is rotatively supported therewith, by a bearing arrangement. The tubular shaft has a distalmost end, which extends into the first flexspline. The tubular shaft has an inwardly directed shoulder thereon. A first wave generator is attached to the distal side of the annular plane of the tubular shaft. An inner bearing race is pressed on the outer periphery of the first wave generator. An outer bearing race is pressed against the inside surface of the first flexspline with a plurality of ball bearings spaced between the inner and outer bearing races. A first plurality of teeth are arranged in the outer periphery of the first flexspline radially outwardly of the wave generator. The radially outwardly directed teeth of the first flexspline are in advancing engagement with an annular arrangement of teeth on a first circular line surrounding the first flexspline. The first circular line is held in a rotative position within the primary housing, by an annular bearing spaced therebetween. The first flexspline has an open second end which is joined to an open flanged end of a hollow first output shaft. The hollow first output shaft is disposed radially of the second flexspline.

A second input shaft is arranged through the first input shaft, and spaced therefrom with an annular bearing arrangement disposed therebetween. The second input shaft has a distalmost end which extends through the second end of the first flexspline, and into the center of the second flux line. The second wave generator is disposed about the distalmost end of the second input shaft, the second wave generator being of a different size, and/or wave shape than the first wave generator. An annular bearing arrangement is fit around the outer periphery of the second wave generator, and within the inside periphery of the second flexspline. A plurality of teeth are machined into the outer periphery of the second flexspline radially outwardly of the wave generator. A second circular line has an array of radially inwardly directed teeth which are in spaced apart engagement with the teeth on the radially outward edge of the second flexspline. The second circular line has an annular bearing arrangement between its radially outermost surface and the inner surface of the first output shaft and is rotatively disposed therewithin. The second circular line has a closed end which is attached to a second output shaft. The first and second output shafts are coaxial with one another, each being arranged to transfer rotative motion therefrom.

The first hollow output shaft is supportively disposed within the primary housing by an annular bearing arranged therebetween. The first and second output shafts extend through an opening at the second end of the primary housing, which shafts pass their power output therethrough.

The second input shaft has a bearing disposed therearound, in contact with the annular flange at the opening end of the second flexspline.

Thus, a first rotative input into the primary housing through the first hollow input shaft will effect a rotary motion within the first wave generator. Rotation of the first wave generator about the common longitudinal axis of both of the input shafts, will induce a rotative motion in the first circular spline. Rotation of the first circular spline will induce motion into the first hollow output shaft and thus create output of a first magnitude therefrom. Rotary input into the second input shaft, will effect rotary motion of the second wave of generator. Motion of the second wave generator within the second flux line will induce rotary motion of a second magnitude within the second circular spline surrounding and in engagement with the second flexspline. The output shaft from the second circular spline may therefore be transmitted at a different magnitude than that from the first output shaft.

Thus it may be seen that a first and second harmonic drive flexspline arrangement may be each coupled to separate input shafts, each flexspline having a different diameter and hence a different output, to permit a first and second output therefrom simultaneously. The primary housing has a flange at its second end which permits it to be sealingly attached to a dual rotary power input device.

The invention thus includes a harmonic drive transmission for the simultaneous production of a first and a second rotary output, comprising a primary housing, a first flexspline secured within the housing, with a first wave generator arranged therewithin, a second flexspline secured within the housing with a second wave generator arranged therewithin. A first driveshaft is connected to the second wave generator, and a second driveshaft is connected to the first wave generator. A first circular spline is in engagement with a plurality of gear teeth and is connected to a first output shaft. A second circular shaft is in engagement with a plurality of gear teeth and is connected to a second output shaft, to provide simultaneous output by a plurality of output shafts from a harmonic drive transmission. The housing has a first end with an opening therethrough, the first flexspline having an open end thereof which is fixedly and sealingly attached to the housing about its open end. The second flexspline has an open end which is sealingly attached to the first flexspline, for securing the second flexspline in a non-rotative configuration to the housing. The first circular spline is rotatively supported in the housing by an arrangement of bearings therebetween. The second circular spline is rotatively supported in the first circular spline by an arrangement of bearings therebetween. The first and second output shafts are coaxial with one another, to permit such simultaneous output therefrom. The first input shaft is rotatively disposed within the second input shaft, through an opening in the housing.

The first flexspline may be of a different diameter from the diameter of the second flexspline. The first wave generator may be of a different outer shape than the second wave generator. The first and second output shafts may have equal outputs therefrom.

The invention also includes a method of generating a plurality of outputs from a harmonic drive transmission, comprising the steps of: arranging a first and a second flexspline within a housing, placing a circular spline in engagement with a plurality of outer teeth, around each of the first and second flexsplines, inserting a first driveshaft into the housing and into a second wave generator within the second flexspline, inserting a second driveshaft into the housing and into a first wave generator in the first flexspline, connecting a first circular spline into engagement with external teeth of the first flexspline, connecting a second circular spline into engagement with external teeth of the second flexspline, and attaching an output shaft to each of the first and second circular splines and through the housing to permit the production of a pair of rotational output drives therefrom. The method includes arranging the first and second input shafts in a coaxial relationship, and arranging the first and second output shafts in a coaxial relationship. The method includes the steps of providing the first and second flexsplines, which may be of equal size, and/or arranging the first and second wave generators in corresponding shapes. The method may include the steps of rotating each of the input shafts at the same rotational speed, and/or directing a rotational input into each of the output shafts, so as to provide a rotational output through each of the normal "input" shafts.

BRIEF DESCRIPTION OF THE DRAWINGS

The objects and advantages of the present invention will become more apparent, when viewed in conjunction with the following drawing in which.

DESCRIPTION OF THE PREFERRED EMBODIMENTS

Figure 1:
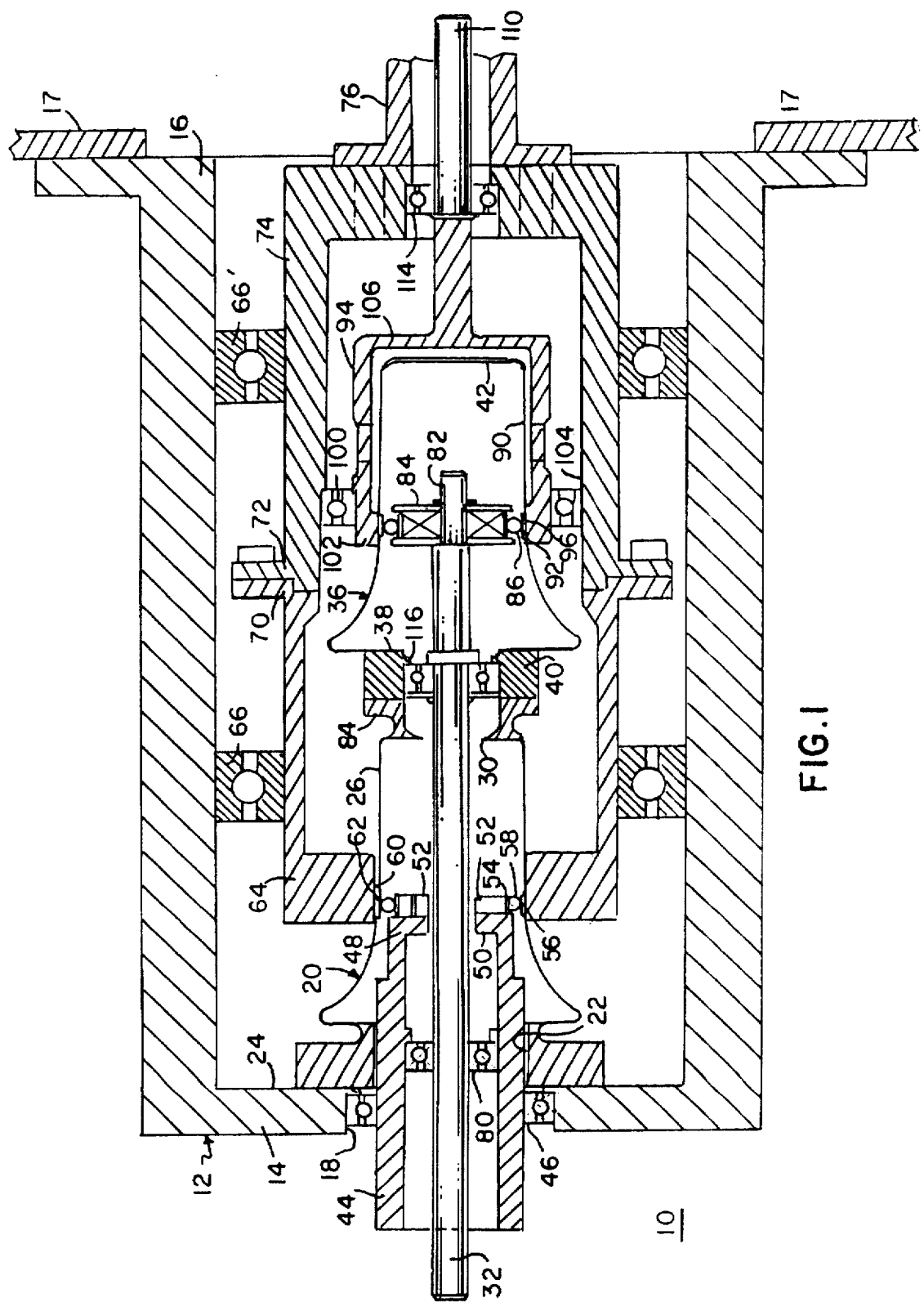
FIG. 1 is a side elevational view in section, showing a harmonic drive transmission constructed according to the principles of the present invention.

Referring now to the drawings in detail, and particularly to FIG. 1, there is shown the present invention which comprises a harmonic drive transmission 10, having a dual coaxial output therefrom and a dual coaxial input. The harmonic drive transmission 10 comprises a primary housing 12 having a first or input end 14 and a second or output end 16, which housing 12 may be sealingly secured to a wall 17 of a rotary device, not shown for clarity, so as to allow the transmission 10 to be in a hermetically sealed pressure and temperature tight relationship therewith. The housing 12 has an opening 18 at its input end 14. A first flexspline 20, having an open annular end portion 22, is non-rotatively attached in a hermetically sealed manner by welding or the like, to the inside wall 24 of the first end 14 of the primary housing 12, radially of the opening 18 thereat. The first flexspline 20 has a cup end 26 opposed to its open end 22. The cup end 26 includes a small opening 30 therethrough, to permit a drive shaft 32 to extend therethrough. The cup end 26 of the first flexspline 20 has an annular shoulder 34 thereat. A second flexspline 36, having an open end 38 with an annular rim 40 therearound, is preferrably sealingly attached to the shoulder 34 and the cup end 26 of the first flexspline 20. The second flexspline 36 is of a second internal diameter (which may be of a different diameter from the diameter of the first flexspline 20), having a closed diaphragm end 42, to ensure the sealed relationship between the ends 12 and 16 of the transmission 10. It is to be noted herein, that the drawing is not necessarily drawn to scale, and proportions and dimensions of the flexsplines, wave generators or the like, may be different without deviating from the scope of the present invention.

A first input, comprising a hollow tubular shaft 44, is disposed through the opening 18 at the first end 14 of the primary housing 12, and is rotatively supported therewith, by a bearing arrangement 46 therein. The tubular shaft 44 has a distalmost end 48, which extends into the first flexspline 20. The tubular shaft 44 has an inwardly directed shoulder 50 thereon. A first wave generator 52 is attached to the distal side of the annular plane of the shoulder 50 on the tubular shaft 44. An inner bearing race 54 is pressed on the outer periphery of the first wave generator 52. An outer bearing race 56 is pressed against the inside surface of the first flexspline 20 with a plurality of ball bearings 58 spaced between the inner and outer bearing races 54 and 56. A first plurality of teeth 60 are arranged in the outer periphery of the first flexspline 20, radially outwardly of the first wave generator 52. The radially outwardly directed teeth 60 of the first flexspline 20 are in advancing engagement with an annular arrangement of teeth 62 on a first circular spline 64 surrounding the first flexspline 20. The first circular spline 64 is held in a rotative position within the primary housing 12, by an arrangement of annular bearings 66 and 66' spaced therebetween. The first circular spline 64 has an open second end 70 which is joined to an open flanged end 72 of a hollow first output shaft 74, which itself is connected to a further output shaft 76. The hollow first output shaft 74 is disposed radially outwardly of the second flexspline 36.

The second input shaft 32 is arranged through the first input shaft 44, and spaced therefrom with an annular bearing 80 arranged therebetween. The second input shaft 32 has a distalmost end 82 which extends through the second end 26 of the first flexspline 20, and into the center of the second flexspline 36. A second wave generator 84 is disposed about the distalmost end 82 of the second input shaft 32, the second wave generator 84 may be of a different size (diameter), and/or wave shape than the first wave generator 52. An annular bearing 86 is press fit around the outer periphery of the second wave generator 84, and within the inside periphery 90 of the second flexspline 36. A plurality of teeth 92 are machined into the outer periphery of the second flexspline 36 radially outwardly of the second wave generator 84. A second circular spline 94 has an array of radially inwardly directed teeth 96 which are in spaced apart engagement with the teeth 92 on the radially outward edge of the second flexspline 36. The second circular spline 94 has an annular bearing 100 arranged between its radially outermost surface 102 and the inner surface 104 of the first output shaft 74, and is rotatively disposed therewithin. The second circular spline 94 has a closed end 106 which is attached to a second output shaft 110. The first and second output shafts 76 and 110 are coaxial with one another, each being arranged to simultaneously transfer dissimilar rotative motion from the harmonic drive transmission of the present invention.

The first hollow output shaft 76 is supportively disposed within the primary housing 12 by the annular bearing 66' arranged therebetween. The first and second output shafts 76 and 110 extend through an opening 112 at the second end 16 of the primary housing 12, which shafts 76 and 110 pass their power output therethrough.

The second input shaft 32 has a bearing 116 disposed therearound, in contact with the annular flange 38 at the open end of the second flexspline 36.

Thus, a co-axial input and a co-axial output is arranged with a harmonic drive transmission to provide a hermetic seal between the input ant the output shafts, by virtue of the combined flexspline arrangement acting as such a pressure and hence a temperature barrier. The flexspline attached to the housing at a first end provides the necessary seal thereat. The dual co-axial output arranged on the second end of the housing and on the other side of the seal barrier permits such sealing effect. A first rotative input is arranged into the primary housing through the first hollow input shaft to effect a rotary motion within the first wave generator. Rotation of the first wave generator about the common longitudinal axis of both of the input shafts, will induce a rotative motion in the first circular spline. Rotation of the first circular spline will induce motion into the first hollow output shaft and thus create output of a first magnitude therefrom. Rotary input into the second input shaft, will effect rotary motion of the secondwave of generator. Motion of the second wave generator within the second flexspline will induce rotary motion of a second magnitude within the second circular spline surrounding in engagement with the second flexspline. The output shaft from the second circular spline will therefore be transmitted at a different magnitude than that from the first output shaft.

Thus it may be seen that a first and second harmonic drive flexspline arrangement may be each coupled to separate input shafts, each wave generator may be equal or preferably of a different shape, number of lobes, or different diameter, each flexspline may have a same or preferably a different diameter and hence a different output, to permit a first and second output therefrom simultaneously. The primary housing has a flange at its second end which permits it to be attached to a dual rotary power input device.

We claim:

1. A harmonic drive transmission for the simultaneous production of a first and a second rotary output, comprising:
   a primary housing;
   a first flexspline secured within said housing, with a first wave generator arranged therewithin;
   a second flexspline secured within said housing with a second wave generator arranged therewithin;
   a first driveshaft connected to said second wave generator;
   a second driveshaft connected to said first wave generator;
   a first circular spline in engagement with a plurality of gear teeth and connected to a first output shaft; and
   a second circular spline in engagement with a plurality of gear teeth and connected to a second output shaft, to provide simultaneous output by a plurality of output shafts from a harmonic drive transmission.

2. The harmonic drive transmission as recited in claim 1, wherein said housing has a first end with an opening therethrough, said first flexspline having an open end thereof which is fixedly attached to said housing about said open end.

3. The harmonic drive transmission as recited in claim 2, wherein said second flexspline has an open end which is attached to said first flexspline, for securing said second flexspline in a non-rotative configuration to said housing.

4. The harmonic drive transmission as recited in claim 3, wherein said first circular spline is rotatively supported in said housing by an arrangement of bearings therebetween.

5. The harmonic drive transmission as recited in claim 4, wherein said second circular spline is rotatively supported in said first circular spline by an arrangement of bearings therebetween.

6. The harmonic drive transmission as recited in claim 4, wherein said first and second output shafts are coaxial with one another, to permit such simultaneous output therefrom.

7. The harmonic drive transmission as recited in claim 6, wherein said first input shaft is rotatively disposed within said second input shaft, through an opening in said housing.

8. The harmonic drive transmission as recited in claim 1, wherein said first flexspline is of a different diameter from the diameter of said second flexspline.

9. The harmonic drive transmission as recited in claim 1, wherein said first wave generator is of a different outer shape than said second wave generator.

10. The harmonic drive transmission as recited in claim 1, wherein said first and second output shafts have equal outputs therefrom.

11. A method of generating a plurality of outputs from a harmonic drive transmission, comprising the steps of:

arranging a first and a second flexspline within a housing;

placing a circular spline in engagement with a plurality of outer teeth, around each of said first and said second flexspline;

inserting a first driveshaft into said housing and into a second wave generator within said second flexspline;

inserting a second driveshaft into said housing and into a first wave generator in said first flexspline;

connecting a first circular spline into engagement with external teeth of said first flexspline;

connecting a second circular spline into engagement with external teeth of said second flexspline; and attaching an output shaft to each of said first and second circular splines and through said housing to permit the production of a pair of rotational output drives therefrom.

12. The method as recited in claim 11, including the step of:

arranging said first and second input shafts in a coaxial relationship.

13. The method as recited in claim 12, including the step of:

arranging said first and second output shafts in a coaxial relationship.

14. The method as recited in claim 11, including the step of:

providing said first and second flexsplines of equal size.

15. The method as recited in claim 11, including the step of:

arranging said first and second wave generators in corresponding shapes.

16. The method as recited in claim 11, including the step of:

rotating each of said input shafts at the same rotational speed.

17. The method as recited in claim 11, including the step of:

directing a rotational input into each of said output shafts, so as to provide a rotational output through each of said normally input shafts.

18. The harmonic drive transmission as recited in claim 2, wherein said open end of said first flexspline is attached to said housing in a hermetically sealed manner to prevent passage of gas pressure therepast.

19. The harmonic drive transmission as recited in claim 3, wherein said open end of said second flexspline is attached to said first flexspline in a hermetically sealed manner to prevent passage of gas pressure therepast.

* * * * *